US012684041B2

(12) United States Patent
Shire et al.

(10) Patent No.: US 12,684,041 B2
(45) Date of Patent: Jul. 14, 2026

(54) CENTRAL NETWORK UNIT AND METHOD THEREIN FOR ENABLING INTERNET ACCESS TO AN ON-BOARD THIRD PARTY APPLICATION

(71) Applicant: Volvo Truck Corporation, Gothenburg (SE)

(72) Inventors: Joshua Shire, Gothenburg (SE); Bo Strömberg, Västra Frölunda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 41 days.

(21) Appl. No.: 18/733,170

(22) Filed: Jun. 4, 2024

(65) Prior Publication Data

US 2024/0414240 A1     Dec. 12, 2024

(30) Foreign Application Priority Data

Jun. 12, 2023     (EP) ..................................... 23178583

(51) Int. Cl.
H04L 67/142     (2022.01)
H04L 67/12     (2022.01)

(52) U.S. Cl.
CPC ............ H04L 67/142 (2013.01); H04L 67/12 (2013.01)

(58) Field of Classification Search
CPC . H04L 67/12; H04L 2209/84; H04L 41/0803; H04L 67/142; H04L 67/53
See application file for complete search history.

(56) References Cited

U.S. PATENT DOCUMENTS

| | | | |
|---|---|---|---|
| 2011/0295444 A1 | 12/2011 | Westra et al. | |
| 2019/0052532 A1* | 2/2019 | Chen | H04L 43/20 |
| 2019/0166494 A1 | 5/2019 | Poplawsky et al. | |
| 2019/0303187 A1* | 10/2019 | Vu | G06F 9/45558 |
| 2020/0184569 A1 | 6/2020 | Katta et al. | |

(Continued)

FOREIGN PATENT DOCUMENTS

| | | |
|---|---|---|
| CN | 105379349 B | 8/2019 |
| CN | 113055835 A | 6/2021 |
| CN | 114640967 A | 6/2022 |

OTHER PUBLICATIONS

Extended European Search Report, European Patent Application No. 23178583.3, mailed Dec. 4, 2023, 8 pages.

*Primary Examiner* — Tonia L Dollinger
*Assistant Examiner* — Linh T. Nguyen
(74) *Attorney, Agent, or Firm* — Sage Patent Group

(57)     ABSTRACT
A central network unit and method therein for enabling internet access to an third-party application executed in an operating system on-board a vehicle in a vehicle communications network is described. It describes obtaining information indicating on-board internet usage by the third-party application per assigned operating system resource. It also describes determining, based on the obtained information, if internet access is to be maintained for the third-party application and/or one or more of its assigned operating system resources. Further, it describes configuring access to one or more external network interfaces on-board the vehicle used by the third-party application and/or one or more of the assigned operating system resources based on the determined information. Computer program products and storage mediums are also described.

12 Claims, 2 Drawing Sheets

(56)    References Cited

U.S. PATENT DOCUMENTS

| | | | |
|---|---|---|---|
| 2020/0412811 A1* | 12/2020 | Campbell | H04L 65/752 |
| 2021/0021530 A1* | 1/2021 | Kim | H04W 4/48 |
| 2022/0043924 A1* | 2/2022 | Hu | H04L 63/0876 |
| 2022/0108337 A1* | 4/2022 | Zhang | H04L 67/12 |
| 2023/0370822 A1* | 11/2023 | Lei | H04W 4/44 |
| 2023/0376294 A1* | 11/2023 | Shire | H04W 4/50 |

* cited by examiner

CENTRAL NETWORK UNIT AND METHOD THEREIN FOR ENABLING INTERNET ACCESS TO AN ON-BOARD THIRD PARTY APPLICATION

CROSS REFERENCE TO RELATED APPLICATION

This application claims priority to European Patent Application No. 23178583.3, filed on Jun. 12, 2023, the disclosure and content of which is incorporated by reference herein in its entirety.

TECHNICAL FIELD

The disclosure relates generally to internet access control onboard a vehicle. In particular aspects, the disclosure relates to a central network unit and method therein for enabling internet access to an third-party application executed in an operating system on-board a vehicle in a vehicle communications network. In further aspects, the disclosure also relates to computer program products for performing the method and storage mediums.

The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Vehicles today have numerous services onboard. Services may be implemented, supported or delivered by software, e.g., an application, onboard the vehicle and provided by the vehicle manufacturer, the vehicle owner or a third-party. An example of an application may be a driver time management system, fleet management system, bodybuilder equipment control, passenger media control, etc. Applications to support or deliver services may be installed and configured onboard the vehicle at manufacturing or at some later time instance. There is a constant need for further improvements related to such services in vehicles.

Different applications supporting, implementing or delivering services running on a vehicle may require communications to different remote, off-board network end points. Often, this endpoint is located on the internet. Other times, these endpoints are located on private networks accessible by a private Access Point Name (APN) or a Virtual Private Network (VPN). This can cause routing challenges if the VPNs or APNs have conflicting Internet Protocol (IP) address spaces. Further, these services or their communications may have different quality, security or safety requirements. Therefore, solutions for how to configure the vehicle in a dynamic way, based upon services bought by the customer, which allows for conflicting IP routing or forwarding tables needs to be provided. It may also be necessary to ensure that communications are segregated and segmented at the logical link level for quality, safety and security. Other issues to consider may be how to support services delivered by applications which may not be designed specifically to run on automotive Electronic Control Units (ECU), and thus demand more traditional internet connectivity as one would expect from a consumer mobile device. Therefore, there is a need to at least mitigate or solve these issues.

For example, one way of addressing these issues is to, upon receiving a request to provide a service requiring certain network capabilities, inflate one or more containers that are adapted to the required networking capabilities and then connect the one or more containers in order to enable the service in one or more on-board ECUs. A container here refers to a logical structure representing segmented part of the vehicle's operating system resources assigned to the service and that are separated from other operating system resources of the vehicle. This enables configuration of the vehicle in a dynamic way, based upon services, which allows for conflicting IP routing or forwarding tables, and ensures that communications are segregated and segmented at the logical link level for quality, safety and security. While this creates an ability to segregate and segment external communications of different on-board services, there is still an issue regarding how to administer the external communications resource usage of the on-board services in order to improve the overall utilization of the external communication link resources of the vehicle.

SUMMARY

According to a first aspect of the embodiments herein, a computer-implemented method performed by a central network unit for enabling internet access to an third-party application executed in an operating system on-board a vehicle in a vehicle communications network. The method comprise obtaining information indicating on-board internet usage by the third-party application per assigned operating system resource. The method also comprise determining, based on the obtained information, if internet access is to be maintained for the third-party application and/or one or more of its assigned operating system resources. Further, the method comprise configuring access to one or more external network interfaces on-board the vehicle used by the third-party application and/or one or more of the assigned operating system resources based on the determined information.

The first aspect of the disclosure may seek improve the overall utilization of the external communication link resources of the vehicle. By obtaining the internet usage of a third party application per assigned operating system resource, such as, e.g., per container, per network link, per network interface, per network device, etc., and determining if the internet access for the third party application is to be maintained based thereon, a technical benefit may include that the external network interfaces used by the third party application may be configured such that the internet access of the third party applications is allowed on a discretionary basis. This means, for example, that other on-board applications/services that may be of higher significance to the operation of the vehicle may be given priority over the third party application.

In some embodiments, the operating system resources comprise one or more containers inflated to support the third-party application, wherein a container is a logical structure representing a segmented part of the operating system's resources assigned to the third-party application and that are separated from other resources of the operating system on-board the vehicle. A technical benefit may include that the advantages with using inflated containers is thereby extended to the third-party application.

In some embodiments, the operating system resources comprise one or more network links used by the third-party application, or local, virtual or remote network devices used by the third-party application that are distributed across multiple Electronic Control Units, ECUs. A technical benefit may include that all external network communication to/from the third-party application on-board the vehicle may be encompassed.

In some embodiments, the determining may be performed using a determined prioritization scheme, where the prioritization scheme is configured to prioritize applications supporting vehicle functionality above the third-party application. In this case, a technical benefit may be that on-board applications/services that may be of higher significance to the operation and/or function of the vehicle is given priority over the less significant operation of the third-party application. In addition, third-party application that no longer should be able to access the internet, or communicate via the on-board network links or devices, may be restricted from doing so without disrupting the access for other onboard application/services.

In some embodiments, the obtaining may comprise receiving the information indicating on-board internet usage by the third-party application per assigned operating system resource from the operating system on-board the vehicle. A technical benefit may include that the internet usage by the third-party application may be logged, stored and then transmitted to the central network unit by the operating system on-board the vehicle.

According to a second aspect of the embodiments herein, a central network unit for enabling internet access to an third-party application executed in an operating system on-board a vehicle in a vehicle communications network is described. The central network unit comprises a processing circuitry and a memory. The processing circuitry is configured to obtain information indicating on-board internet usage by the third-party application per assigned operating system resource. The processing circuitry is also configured to determine, based on the obtained information, if internet access is to be maintained for the third-party application and/or one or more of its assigned operating system resources. Further, the processing circuitry is configured to configure access to one or more external network interfaces on-board the vehicle used by the third-party application and/or one or more of the assigned operating system resources based on the determined information.

In some embodiments, the operating system resources comprise one or more containers inflated to support the third-party application, wherein a container is a logical structure representing a segmented part of the operating system's resources assigned to the third-party application and that are separated from other resources of the operating system on-board the vehicle.

According to some embodiments, the operating system resources comprise one or more network link used by the third-party application, or local, virtual or remote network devices used by the third-party application that are distributed across multiple Electronic Control Units, ECUs.

In some embodiments, the processing circuitry may further be configured to determine if internet access is to be maintained using a determined prioritization scheme, where the prioritization scheme is configured to prioritize applications supporting vehicle functionality above the third-party application.

In some embodiments, the processing circuitry may further be configured to receive the information indicating on-board internet usage by the third-party application per assigned operating system resource from the operating system on-board the vehicle.

Effects and advantages of this second aspect is to a large extent analogous to those described above in connection with the first aspect.

According to a third aspect of the embodiments herein, a computer program product comprising program code means for performing the steps of the methods described above when said program is run on a processing circuitry of a network system or a processing circuitry of a user device, respectively, is described. According to a fourth aspect of the embodiments herein, a non-transitory computer-readable storage medium comprising instructions, which when executed on a processing circuitry of a network system or on a processing circuitry of a user device, cause the processing circuitry to perform the methods described above is described. Effects and advantages of the third and fourth aspects are to a large extent analogous to those described above in connection with the first and second aspect.

The above aspects, accompanying claims, and/or embodiments disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Aspects set forth below represent the necessary information to enable those skilled in the art to practice the disclosure.

Figure 1:
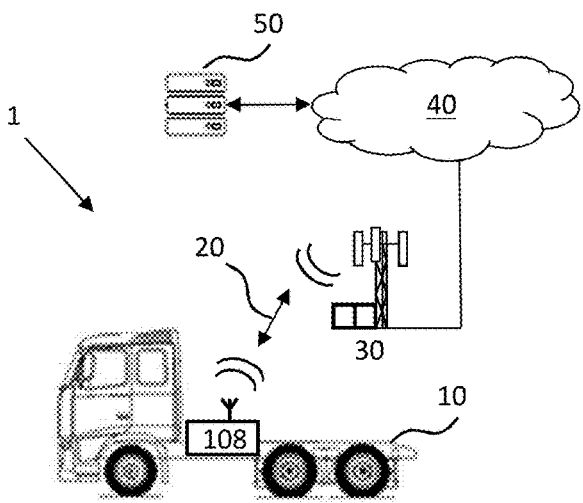
FIG. 1 is a schematic illustration of communications network in which a central network unit according to some embodiments may be implemented.

FIG. 1 is a schematic drawing illustrating a communication system 1. The communication system 1 comprise a vehicle 10, a vehicle communications network 30, 40 and a central network unit 50. The vehicle 10 may be a heavy-duty vehicle, such as, for example, a truck, a buss or a construction equipment. The vehicle 10 may also be other vehicles, such as, trailers, wheel loaders, articulated haulers, excavators, backhoe loaders, passenger cars, marine vessels, working machines, etc. For the sake of simplicity, the term vehicle will be used herein when referring to any of the above examples of vehicles.

As shown in FIG. 1, the vehicle 10 may further comprise one or more ECUs 108, which also may be referred to as processing circuitry or circuitries. The one or more ECUs 108 may comprise both hardware and software. ECU is short for Electronic Control Unit and may also be known as an electronic control module. The one or more ECUs 108 may be arranged to control a specific function, e.g., an electronic function, in the vehicle 10 such as, e.g., an electrical engine, an airbag, seat heating, infotainment system, brake control, etc. The one or more ECUs 108 may represent or comprise an operating system instance, e.g., an instance of the vehicle's operating system. In other words, the one or more ECUs 108 may also be arranged to function and operate as a vehicle computer in the vehicle 10. Thus, the vehicle 10 may via the one or more ECUs 108 be arranged to operate one or more services.

A service may be implemented, supported or delivered by software, e.g., an application. A service may also be delivered via the application to the vehicle 10. The application may exist and require configuration or may need to be pushed down and installed on the one or more ECUs 108 onboard the vehicle 10. Besides services that may be provided by the vehicle manufacturer's or the vehicle owner's applications, other services may be provided by a third-party, i.e., any one other than the vehicle manufacturer or the vehicle owner, via a third party application. The applications or third party applications to support or deliver the service in/to the vehicle 10 may be provided to the vehicle 10 at manufacturing or at some later time instance during the vehicle lifetime. The third party application may also be part of a software running on a third-party accessory or product installed in the vehicle 10 and connected to the one or more ECUs 108.

The one or more ECUs 108 onboard the vehicle 10 and the vehicle communications network 30, 40 may be arranged to be connected to each other via wired or wireless connection. The vehicle communications network 20, 30 may be implemented as part of a wireless communication network, such as, a wireless telecommunications or mobile network. Thus, the one or more ECUs 108 onboard the vehicle 10 may, for example, be arranged to communicate over the vehicle communications network 30, 40 via a wireless connection 20. The vehicle communications network 30, 40 may also be arranged to connect the vehicle 10 with the central network unit 50. The central network unit 50 and the vehicle communications network 20, 30 may also be adapted to be connected to each other via a wired and/or wireless connection.

The central network unit 50 in FIG. 1 may also be referred to as a remote service management system, or if implemented using a cloud server or service, a cloud service management system. The central network unit 50 may comprise a configuration database (not shown in FIG. 1) in which vehicle configuration data of the vehicle 10 may be arranged and stored. The vehicle configuration data may also comprise configuration data of the services provided in/to the vehicle 10. The central network unit 50, i.e., a network node or unit centrally located in the communications network 1, may suitable be referred to as central, since it is remotely located from the vehicle 10, e.g., at a different location than the vehicle 10 and at a distance from the vehicle 10, and may service several different vehicle or fleet of vehicles from a single network location. The central network unit 50 may be arranged to manage services for the vehicle 10, for example, by obtaining requests for new services, updated services, changed services, etc., that may be requested by, for example, a user, a central service, a vehicle fleet manager, etc. For example, a user, e.g., a vehicle fleet manager, having access to the central network unit 50 may request a service for the vehicle 10. The central network unit 50 may comprise a service marketplace or a service management portal through which the user may request a particular service for the vehicle 10.

Further, the central network unit 50 may be arranged to handle the configuration of the one or more ECUs 108 onboard the vehicle 10 via the vehicle communications network 30, 40. For example, the central network unit 50 may be arranged to inflate one or more containers adapted to support an application. Also, the central network unit 50 may also be arranged to configure one or more logical networks and logical network interfaces to support the service and the one or more containers. Further, the central network unit 50 may be arranged to initiate configuration of one or more ECUs 108 comprised in the vehicle 10 to connect the one or more containers 301 in order to enable a service. A more detailed description of these steps and the containers are described below with reference to FIG. 2.

Figure 2:
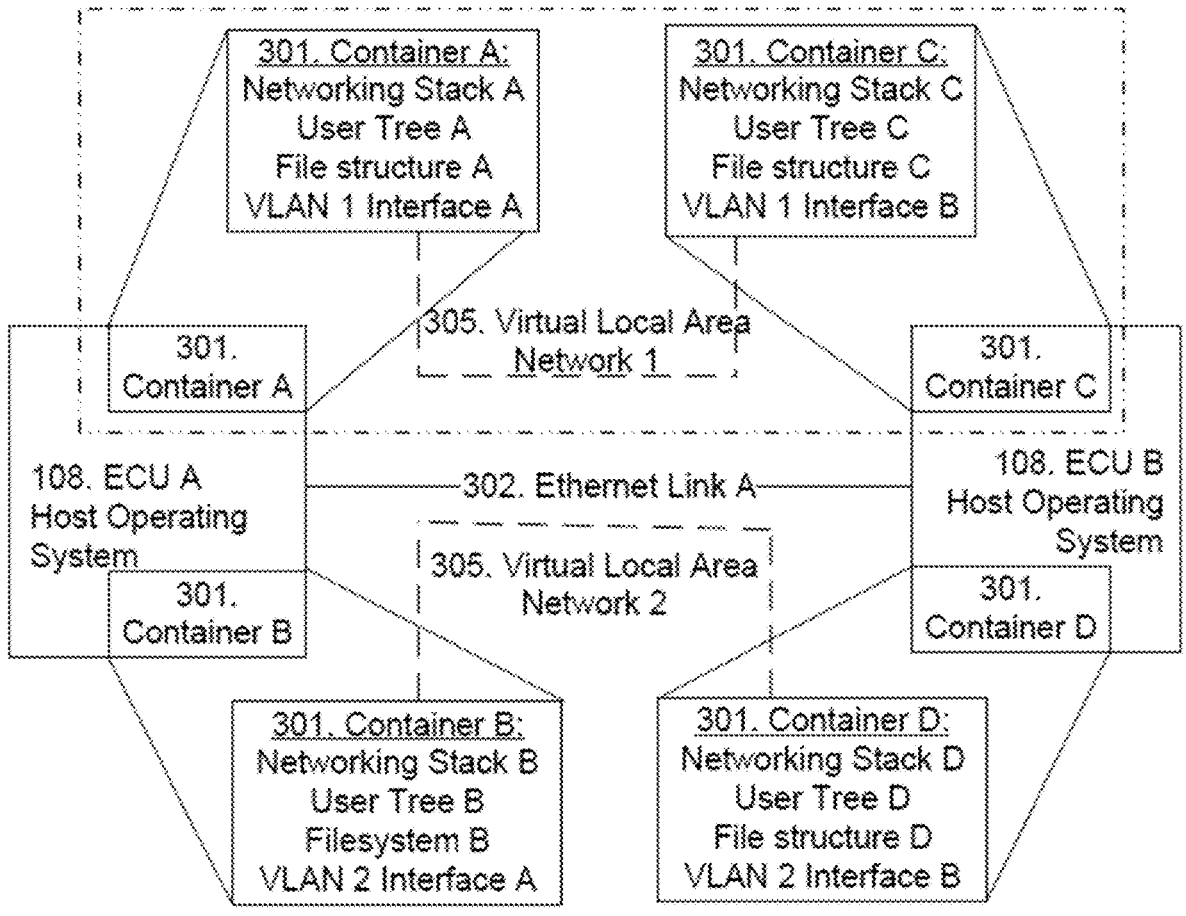
FIG. 2 is a schematic drawing illustrating container.
Figure 3:
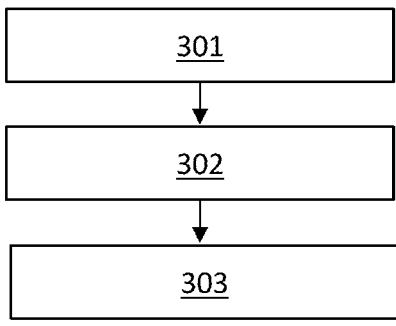
FIG. 3 is a flowchart depicting embodiments of a method for enabling internet access to an third-party application executed in an operating system on-board a vehicle in a vehicle communications network according to some embodiments.

FIG. 2 is a schematic drawing illustrating an example with two ECUs 108, i.e., ECU A and ECU B, wherein each of the two ECUs 108 has inflated containers 301 for supporting one or more services in the vehicle 10. Each of the ECUs 108 may have a host operating system. ECU A and ECU B may be connected via an Ethernet link A 302. In the example shown in FIG. 3, four (4) containers 301 are inflated, i.e., container A and container B connected to ECU A 108 and container C and container D connected to ECU B 108. Containers 301 for each ECU 108 may be connected via a virtual local area network 305. For example, container A for ECU A and container C for ECU B may be connected via the virtual local area network 1, while container B for ECU A and container D for ECU B may be connected via the virtual local area network 2. Note that the number of containers 301, ECUs 108, etc., that are shown in FIG. 3 are only one example and that any other suitable number of entities may be applicable. Each container 301 has, for example, its own networking stack, user tree, file structure and VLAN interface.

Consider an example with a file structure that that lives on persistent storage. In this example, for each container 301 a new root may be created (\ from the perspective of the applications within the container 301, but from the host it looks like \container1, \container2, and so on. So the host storage may be further segmented. In another example with a user tree, each container 301 has its own User ID, UID, tree, so there may be a UID in each container 301, but they are logically different users, and the scope of that user is that container 301 only. In a further example, with network resources, the root namespace or the host may have a routing table that, for example, says default route should go to 192.168.0.1. A container 301 on that host that have its own routing table with a conflicting route, so it could say default goes to 192.168.0.2. Another example may be firewall rules where the host may deny everything, whereas a container 301 may allow all forwarding. Here, it should be noted that unlike virtualization where it may also be possible do these things, the operating system in the vehicle 10 may not run a separate instance of the Linux (for example) kernel for each container 301. Instead, the operating system in the vehicle 10 may create a logical subdivision, i.e., the container 301, of the existing kernel instance which is more efficient compared to virtualization.

As mentioned earlier in reference to FIG. 1, the central network unit 50 may be arranged to inflate a one or more containers 301 adapted to support an application. The one or more containers 301 are logical structures each representing a segmented part of the operating system resources in the vehicle 10 assigned to a service and that are separated from other operating system resources of the vehicle 10. Inflating of the one or more containers 301 may be adapted to specific vehicle hardware, vehicle software, vehicle operating region and vehicle product class. One example of how the central network unit 50 may inflate the one or more containers 301 may comprise one or more of the following steps:

a) Initializing, logically segmenting and assigning, or migrating additional Local Area Network (LAN), Wide Area Network (WAN) or Personal Area Network (PAN) links, e.g., LTE APN or Sat., to a container 301, for example by specifying and attaching to additional APN contexts on a single Long Term Evolution (LTE) Network Access Device and assigning the resulting layer 3 WAN interface to the container 301, initializing a new BLE GAP state machine, a Generic Attribute Profile (GATT) server etc. BLE is short for Bluetooth Low Energy and GAP is short or Generic Access Profile.

b) Initializing, segmenting, or migrating local area network links such as initializing a new 802.1Q Virtual Local Area Network (VLAN) Ethernet sub-interface, which can segment one physical Ethernet link into multiple logical links, and assigning it to the inflated container 301.

c) Applying firewall configurations to the new namespace, such as net filter rules to restrict the flow or data in to processing or applications running in the container 301, out from processing running in the container 301 or through the new container 301.

d) Applying routing and forwarding table configurations to the link and network layer within the namespace.

e) Installing, configuring and initializing any applications required to support the service in the new namespace, such as a Domain Name System (DNS) forwarder.

f) Connecting to certain WiFi SSIDs and creating a connection onboard between an application and this WiFi network.

With this type of containerization, it is possible to configure the vehicle 10 in a dynamic way, based upon requested services. With the use of one or more containers 301, it allows for conflicting IP routing or forwarding tables and ensures that communications are segregated and segmented at the logical link level for quality, safety and security. Furthermore, this also supports services delivered by applications, such as, e.g., third-party applications, which may not be designed specifically to run on automotive ECUs 108, and thus demand more traditional internet connectivity as one would expect from a consumer mobile device. For example, an third-party application for a service designed for an Android phone may be expected to be able to make a request towards the Android framework for, e.g., a socket towards a web server. In this case, the Android framework expects there to be a network access device, e.g., a cellular modem, directly accessible to it which provides this internet access. The Android framework was/is not really designed to have a distributed architecture where the onboard gateway is a remote ECU 108 that is Ethernet accessible, nor was it designed to deal with the fact there may be segments of a network accessible by the framework which only certain applications should get access to, even if they only have user level privileges on the system. This gap is enabled to be bridged by allowing the vehicle 10 to configure itself in such a way so that the application can make a simple socket request and does not have to do anything else. In other words, the complexity is hidden from it.

In other words, a container 301 enables an individual application to be segregated from a host operating system's other process. Rather than running an entire operating system as in a VM, a container 301 implements only those interfaces required by the application running in the container 301. Containers 301 may be implemented using namespaces, e.g., Linux namespaces. Namespaces are a Linux Kernel feature which provides for segregation of various kernel resources, e.g., memory, sockets, network interfaces, etc. If a network namespace exists on a Linux machine, an application running within that namespace, or container 301, will not see the same network stack as an application running outside of it. The application will see its own routing and forwarding tables, netfilter tables, socket list, etc. A namespace may be described as a named region in which the container 301 runs and which separates the container from other containers 301 and the host operating system. There may be one or more containers 301 in one namespace. If there are multiple containers 301 in one namespace, then they are arranged to access each other as if they were on the same host operating system. Containers 301 in different namespaces are separated from each other as if they were on different host operating systems. Multiple types of namespaces can be combined together to achieve a desired level of segregation.

For example, a docker container 301 is an example of an implementation of application containerization which uses Linux Kernel namespaces to achieve segregation. The container 301 may be a logical structure at a data link layer of an Open Systems Interconnection Model (OSI). A plurality of containers 301 may interact over a logical network fabric. It is not necessarily a single container 301 on a single computing unit, e.g., the ECU 108 or a virtual operating system running on a host, that is configured, but multiple containers across computing units may be connected by a logical network segment setup for this purpose. The container 301 is arranged to deliver a service across a fabric of heterogenous hardware and software. The service may require one or more containers 301. For example, some services require container x, some services require container y, and all can be running at the same time if multiple services at configured at the same time. Containers 301 may be shared or exclusive to a single container 301.

As also mentioned earlier in reference to FIG. 1, the central network unit 50 may also configure one or more logical networks to support the service and the one or more containers 301. Containers 301 may connect to or form part of the logical network. It should be noted that the logical network may be configured separately from the container inflation, at the same time instances or at different time instances.

As further mentioned earlier in reference to FIG. 1, the central network unit 50 may also initiate a configuration of the one or more ECUs 108 comprised in the vehicle 10 to connect the one or more containers 301 in order to enable the service. As a result of the initiating, the one or more ECUs 108 may be configured to connect the one or more containers 301 and thereby the service is enabled in the vehicle 10. The initiating of the configuration of one or more ECUs 108 may be performed by the central network unit 50 by sending configuration instructions to the one or more ECUs 108. The configuration instructions may comprise information indicating that the one or more ECUs 108 should connect to the one or more containers 301 in order to enable the service. The one or more ECUs 108 may then configure themselves based on the received configuration instructions to connect to the new logical network and utilize the services available on it based upon the received configuration data. The initiating of the configuration of one or more ECUs 108 may be performed in the central network unit 50 distributes configuration data to other onboard ECUs 108, i.e., served ECUs 108, implementing applications required for the service, and which will utilize the new logical network. The one or more ECUs 108 will utilize the new logical network. Served ECUs 108 may receive configuration data, configure themselves to connect to the new logical network, and utilize the services available on it based upon the received configuration data. The one or more ECUs 108 may receive the configuration data, for example, via an onboard communications gateway comprised in the vehicle 10.

Embodiments of a computer-implemented method performed by a central network unit 50 for enabling internet access to an third-party application executed in an operating system on-board a vehicle 10 in a vehicle communications network 30, 40, will now be described with reference to the flowchart depicted in FIG. 3. FIG. 3 is an illustrated example of actions, steps or operations which may be performed by the central network unit 50 described above with reference to FIG. 3. The method may comprise the following actions, steps or operations.

Action 301. The central network unit 50 obtains information indicating on-board internet usage by the third-party application per its assigned operating system resource 108, 301, 302. This means, for example, that the central network unit 50 may obtain usage data by the third-party application by its used resources of the vehicle's 10 onboard operating system resources 108, 301, 302. For example, the usage data of the third-party application may be obtained by the central network node 50 by monitoring the internet data traffic from the vehicle 10. In some embodiments, the central network unit 50 may receive the information indicating on-board internet usage by the third-party application per assigned operating system resource 108, 301, 302 from the operating system on-board the vehicle 10. This means, for example, that the vehicle's 10 onboard operating system resources 108, 301, 302 may collect the usage data by the third-party application by its used resources, and then report this to the central network unit 50. According to one example, for monitoring the internet usage by the third-party application, a Service and Entertainment Module, SEM, service may be deployed by the central network unit 50 to the vehicle 10. The deployed SEM service may transmit the collected per application network interface usage, which e.g., may be collected by an on-board Android operating system. This may then be transmitted to intermediate network unit on-board the vehicle 10, e.g., a gateway using a Service Platform API, and then forwarded to the central network unit 50, e.g., via Simple Workflow Access Protocol, SWAP. However, the SEM service may also use a type of message broker service, e.g., a Message Queuing Telemetry Transport, MQTT, protocol, which then may be disseminated across the one or more ECUs 108 and directly communicate with the central network unit 50.

According to some embodiments, the operating system resources 108, 301, 302 may comprise one or more containers 301 inflated to support the third-party application. Here, as described above, the container 301 may be a logical structure representing a segmented part of the operating systems resources 108, 301, 302 assigned to the third-party application and that are separated from other resources of the operating system on-board the vehicle 10. This means, for example, that the central network unit 50 may have configured the vehicle 10 such that there are existing deployed applications, containers, configured virtual network segments, as well as, local, virtual or remote devices on multiple ECUs across the vehicle 10. Furthermore, the central network unit 50 may have inflated one or more containers 301 adapted to support the third-party application. As mentioned earlier, a container 301 is a logical structure representing a segmented part of the vehicle's 40 operating system resources assigned to the service and that are separated from other operating system resources of the vehicle 10. For example, if the operating system resource is associated with communication, then the container 301 may be described as a logical structure configured to isolate communication related to the service from other communication to and/or from the vehicle 10. Communication isolation is one example use of the container 301. In general, the container 301 will segment operating systems resources, which may comprise memory, storage, processing, etc. Inflating of the one or more containers 301 may be adapted to vehicle hardware, vehicle software, vehicle operating region and vehicle product class. Different vehicles 100 may have different network architectures, e.g., different IP and VLAN. The container 301 may therefore need to be configured to support that particular vehicle 10. There may be a dynamic component where the precise configuration of the container 301 may also be dependent upon the other already configured containers 301, and of course the service it shall support. A container 301 may be described as a software, a computer program, a computing unit, etc. It may be described as an isolated process that are isolated from other processes but still running on the same kernel. With a container 301, an individual third-party application may be segregated from a host operating system's other process. Rather than running an entire operating system as in a Virtual Machine (VM), a container 301 implements only those interfaces required by the third-party application running in the container 301. The container 301 provides a logical structure configured to isolate communication related to the requested service from at least one other form of communication by the vehicle 10. Hence, the central network unit 50 is able to discern and isolate communication related to the service from other communication to and/or from the vehicle 10.

Also, in some embodiments, the operating system resources 108, 301, 302 comprise one or more network link 302 used by the third-party application, or local, virtual or remote network devices used by the third-party application that are distributed across multiple Electronic Control Units, ECUs 108. This means, for example, that the central network unit 50 may obtain usage data by the third-party application by its used resources, e.g., containers, network links, network interfaces, or network devices, connected with the vehicle's 10 onboard operating system resources 108, 301, 302.

Action 302. After obtaining the information in Action 301, the central network unit 50 determines, based on the obtained information, if internet access is to be maintained for the third-party application and/or one or more of its assigned operating system resources 108, 301, 302. This means, for example, that the central network unit 50 may be provided with a mechanism to allow applications to use on-board network accessible devices on a discretionary basis. For example, the central network unit 50 may control whether or not a user have paid for the internet access usage on-board the vehicle 10 by the third-party application prior to the third-party application being granted access to the on-board external network interfaces that it intends to use.

According to some embodiments, the central network unit 50 may determine if internet access is to be maintained using a determined prioritization scheme, where the prioritization scheme is configured to prioritize applications supporting vehicle functionality above the third-party application. This provides for a mechanism in the central network unit 50 for the configuration to include prioritization information, so that network links serving third party applications or operating systems hosting containers or services which are providing services to third party applications may prioritize the needs of each application in respect to its significance to the operation of the vehicle 10. For example, prioritization schemes may comprise usage of Priority Code Point, PCP, on Ethernet frames, which are set according to the VLAN that they are associated with. These may then be associated with certain applications, such as, e.g., on-board applications significant to the function of the vehicle 10. These on-board applications significant to the function of the vehicle 10 may then be given access to a VLAN with a higher priority than, for example, applications and/or accessory applications from third parties which may be given access to VLANs with lower priority. According to another example, on-board the vehicle 10, the communication containers (or namespaces) hosting the processes to receive and transmit data from on-board vehicle applications may be given a higher priority access to a CPU and unrestricted memory usage, whereas the communication containers for third-party applications or accessory applications may be given limited access, e.g., to preserve the function of the vehicle 10.

Action 303. After determining whether or not internet access is to be maintained in Action 302, the central network unit 50 configures access to one or more external network interfaces onboard the vehicle 10 used by the third-party application and/or one or more of the assigned operating system resources 108, 301, 302 based on the determined information. This means, for example, that the central network unit 50 may control the internet access to the third-party application and/or to one or more of its assigned operating system resources 108, 301, 302 on a discretionary basis.

Figure 4:
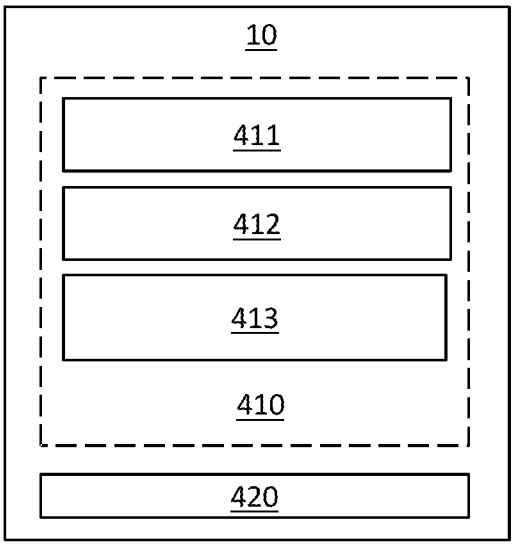
FIG. 4 is a schematic block diagram depicting embodiments of a central network unit.

To perform the method actions for enabling internet access to an third-party application executed in an operating system on-board a vehicle 10 in a vehicle communications network 30, 40, the central network unit 10 may comprise the following arrangement depicted in FIG. 4. FIG. 4 shows a schematic block diagram of embodiments of the central network unit 10. The embodiments of the central network unit 10 described herein may be considered as independent examples, or may be considered in any combination with each other to describe non-limiting examples. It should also be noted that, although not shown in FIG. 3, it should be noted that known conventional features of a central network unit 10, such as, for example, a connection to the mains, network connections (e.g., input/output ports, etc.), etc., may be assumed to be comprised in the central network unit 10 but is not shown or described any further in regards to FIG. 3. The central network unit 10 may comprise one or more centrally located or distributed network unit(s), wherein the system 100 and the one or more network unit(s) may comprise processing circuitry 410 and a memory 420. It should also be noted that some or all of the functionality described in the examples above as being performed by the central network unit 10 may be provided by the processing circuitry 410 executing instructions stored on a computer-readable medium, such as, the memory 420 shown in FIG. 4. The processing circuitry 410 may also comprise an obtaining module 411, a determining module 412, and a configuring module 413, each responsible for providing its functionality to support the examples described herein.

The central network unit 10 or processing circuitry 410 is configured to, or may comprise the obtaining module 411 configured to, obtain information indicating on-board internet usage by the third-party application per assigned operating system resource 108, 301, 302. Also, the central network unit 10 or processing circuitry 410 is also configured to, or may comprise the determining module 412 configured to, determine, based on the obtained information, if internet access is to be maintained for the third-party application and/or one or more of its assigned operating system resources 108, 301, 302. Furthermore, the central network unit 10 or processing circuitry 410 is configured to, or may comprise the configuring module 413 configured to, configure access to one or more external network interfaces on-board the vehicle 10 used by the third-party application and/or one or more of the assigned operating system resources 108, 301, 302 based on the determined information.

According to some embodiments, the operating system resources 108, 301, 302 comprise one or more containers 301 inflated to support the third-party application, wherein a container 301 is a logical structure representing a segmented part of the operating systems resources 108, 301, 302 assigned to the third-party application and that are separated from other resources of the operating system on-board the vehicle 10. In some embodiments, the operating system resources comprise one or more network link 302 used by the third-party application, or local, virtual or remote network devices used by the third-party application that are distributed across multiple Electronic Control Units, ECUs 108.

In some embodiments, the central network unit 10 or processing circuitry 410 may be configured to, or may comprise the configuring module 413 configured to, determine if internet access is to be maintained using a determined prioritization scheme, where the prioritization scheme is configured to prioritize applications supporting vehicle functionality above the third-party application. This provides for a mechanism in the central network unit 50 for the configuration to include prioritization information, so that network links serving third party applications or operating systems hosting containers or services which are providing services to third party applications may prioritize the needs of each application in respect to its significance to the operation of the vehicle 10. For example, prioritization schemes may comprise usage of Priority Code Point, PCP, on Ethernet frames, which are set according to the VLAN that they are associated with. These may then be associated with certain applications, such as, e.g., on-board applications significant to the function of the vehicle 10. These on-board applications significant to the function of the vehicle 10 may then be given access to a VLAN with a higher priority than, for example, applications and/or accessory applications from third parties which may be given access to VLANs with lower priority. According to another example, on-board the vehicle 10, the communication containers (or namespaces) hosting the processes to receive and transmit data from on-board vehicle applications may be given a higher priority access to a CPU and unrestricted memory usage, whereas the communication containers for third-party applications or accessory applications may be given limited access, e.g., to preserve the function of the vehicle 10.

In some embodiments, the central network unit 10 or processing circuitry 410 may be configured to, or may comprise the configuring module 413 configured to, receive the information indicating on-board internet usage by the third-party application per assigned operating system resource 108, 301, 302 from the operating system on-board the vehicle 10.

Furthermore, the embodiments for enabling internet access to an third-party application executed in an operating system on-board a vehicle 10 in a vehicle communications network 30, 40 described above may be implemented through one or more processors, such as the processing circuitry 410 in the central network unit 10 depicted in FIG. 4, together with computer program code for performing the functions and actions of the examples herein. The program code mentioned above may also be provided as a computer program product, for instance in the form of a data carrier carrying computer program code or code means for performing the examples herein when being loaded into the processing circuitry 410 in the central network unit 10. The computer program code may e.g., be provided as pure program code in the central network unit 10 or on a server and downloaded to the central network unit 10. Thus, it should be noted that the modules of the central network unit 10 may in some examples be implemented as computer programs stored in memory, e.g., in the memory modules 420 in FIG. 4, for execution by processors or processing modules, e.g., the processing circuitry 410 of FIG. 4. Those skilled in the art will also appreciate that the processing circuitry 410 and the memory 420 described above may refer to a combination of analog and digital circuits, and/or one or more processors configured with software and/or firmware, e.g., stored in a memory, that when executed by the one or more processors such as the processing circuitry 410 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 5:
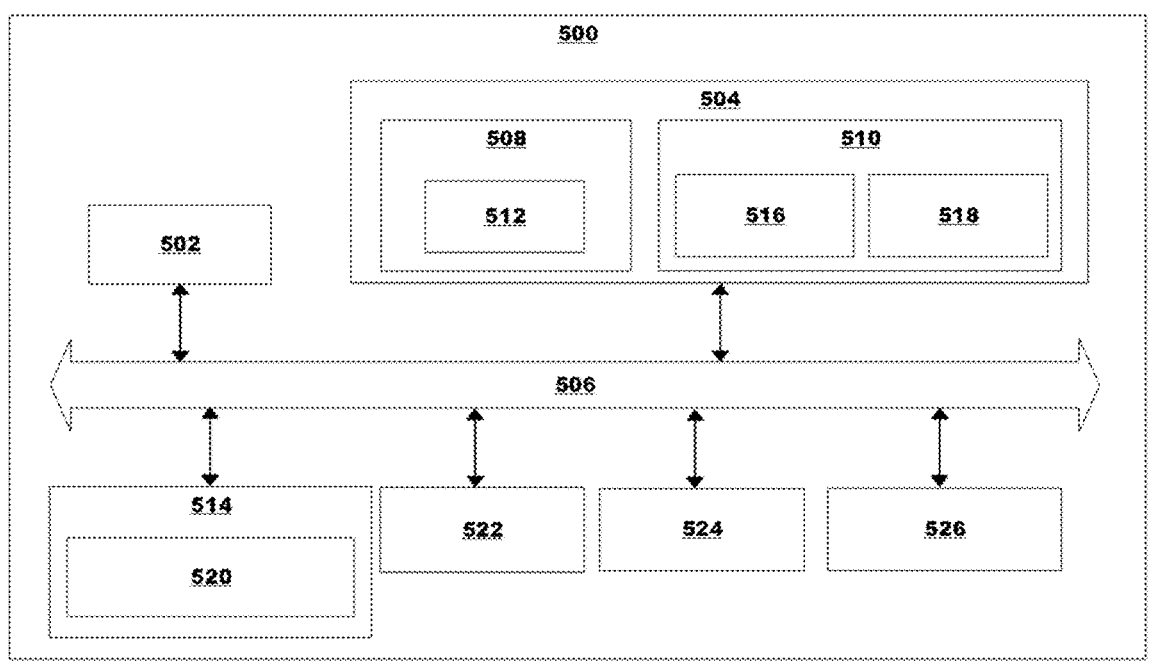
FIG. 5 is a schematic diagram of an exemplary computer system for implementing embodiments disclosed herein according to some embodiments.

FIG. 5 is a schematic diagram of a computer system 500 for implementing examples disclosed herein. The computer system 500 is adapted to execute instructions from a computer-readable medium to perform these and/or any of the functions or processing described herein. The computer system 500 may be connected (e.g., networked) to other machines in a LAN, an intranet, an extranet, or the Internet. While only a single device is illustrated, the computer system 500 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 500 may comprise at least one computing device or electronic device capable of including firmware, hardware, and/or executing software instructions to implement the functionality described herein. The computer system 500 may include a processor device 502 (may also be referred to as a control unit), a memory 504, and a system bus 506. The computer system 500 may include at least one computing device having the processor device 502. The system bus 506 provides an interface for system components including, but not limited to, the memory 504 and the processor device 502. The processor device 502 may include any number of hardware components for conducting data or signal processing or for executing computer code stored in memory 504. The processor device 502 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 506 may be any of several types of bus structures that may further interconnect to a memory bus (with or without a memory controller), a peripheral bus, and/or a local bus using any of a variety of bus architectures. The memory 504 may be one or more devices for storing data and/or computer code for completing or facilitating methods described herein. The memory 504 may include database components, object code components, script components, or other types of information structure for supporting the various activities herein. Any distributed or local memory device may be utilized with the systems and methods of this description. The memory 504 may be communicably connected to the processor device 502 (e.g., via a circuit or any other wired, wireless, or network connection) and may include computer code for executing one or more processes described herein. The memory 504 may include non-volatile memory 505 (e.g., read-only memory (ROM), erasable programmable read-only memory (EPROM), electrically erasable programmable read-only memory (EEPROM), etc.), and volatile memory 510 (e.g., random-access memory (RAM)), or any other medium which can be used to carry or store desired program code in the form of machine-executable instructions or data structures and which can be accessed by a computer or other machine with a processor device 502. A basic input/output system (BIOS) 512 may be stored in the non-volatile memory 505 and can include the basic routines that help to transfer information between elements within the computer system 500.

The computer system 500 may further include or be coupled to a non-transitory computer-readable storage medium such as the storage device 514, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 514 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 514 and/or in the volatile memory 510, which may include an operating system 516 and/or one or more program modules 515. All or a portion of the examples disclosed herein may be implemented as a computer program product 520 stored on a transitory or non-transitory computer-usable or computer-readable storage medium (e.g., single medium or multiple media), such as the storage device 514, which includes complex programming instructions (e.g., complex computer-readable program code) to cause the processor device 502 to carry out the steps described herein. Thus, the computer-readable program code can comprise software instructions for implementing the functionality of the examples described herein when executed by the processor device 502. The processor device 502 may serve as a controller or control system for the computer system 500 that is to implement the functionality described herein.

The computer system 500 also may include an input device interface 522 (e.g., input device interface and/or output device interface). The input device interface 522 may be configured to receive input and selections to be communicated to the computer system 500 when executing instructions, such as from a keyboard, mouse, touch-sensitive surface, etc. Such input devices may be connected to the processor device 502 through the input device interface 522 coupled to the system bus 506 but can be connected through other interfaces such as a parallel port, an Institute of Electrical and Electronic Engineers (IEEE) 1394 serial port, a Universal Serial Bus (USB) port, an IR interface, and the like. The computer system 500 may include an output device interface 524 configured to forward output, such as to a display, a video display unit (e.g., a liquid crystal display (LCD) or a cathode ray tube (CRT)). The computer system 500 may also include a communications interface 426 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

According to some additional examples, a control system comprising one or more control units configured to perform the method according to any of the examples described above is also provided.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A computer-implemented method performed by a central network unit for enabling internet access to a third-party application executed in an operating system on-board a vehicle in a vehicle communications network, the method comprising:

obtaining information indicating on-board internet usage by the third-party application per assigned operating system resource;

determining, based on the obtained information, if internet access is to be maintained for the third-party application and/or one or more of its assigned operating system resources; and configuring access to one or more external network interfaces on-board the vehicle used by the third-party application and/or one or more of the assigned operating system resources based on the determined information.

2. The computer-implemented method according to claim 1, wherein the operating system resources comprise one or more containers inflated to support the third-party application, wherein a container is a logical structure representing a segmented part of the operating systems resources assigned to the third-party application and that are separated from other resources of the operating system on-board the vehicle.

3. The computer-implemented method according to claim 1, wherein the operating system resources comprise one or more network link used by the third-party application, or local, virtual or remote network devices used by the third-party application that are distributed across multiple Electronic Control Units (ECUs).

4. The computer-implemented method according to claim 1, wherein the determining is performed using a determined prioritization scheme, wherein the prioritization scheme is configured to prioritize applications supporting vehicle functionality above the third-party application.

5. The computer-implemented method according to claim 1, wherein the obtaining comprises receiving the information indicating on-board internet usage by the third-party application per assigned operating system resource from the operating system on-board the vehicle.

6. A central network unit for enabling internet access to a third-party application executed in an operating system on-board a vehicle in a vehicle communications network, the central network unit comprising a processing circuitry and a memory, the processing circuitry being configured to:
  obtain information indicating on-board internet usage by the third-party application per assigned operating system resource, determine, based on the obtained information, if internet access is to be maintained for the third-party application and/or one or more of its assigned operating system resources, and configure access to one or more external network interfaces on-board the vehicle used by the third-party application and/or one or more of the assigned operating system resources based on the determined information.

7. The central network unit according to claim 6, wherein the operating system resources comprise one or more containers inflated to support the third-party application, wherein a container is a logical structure representing a segmented part of the operating systems resources assigned to the third-party application and that are separated from other resources of the operating system on-board the vehicle.

8. The central network unit according to claim 6, wherein the operating system resources comprise one or more network link used by the third-party application, or local, virtual or remote network devices used by the third-party application that are distributed across multiple Electronic Control Units (ECUs).

9. The central network unit according to claim 6, wherein the processing circuitry is further configured to determine if internet access is to be maintained using a determined prioritization scheme, where the prioritization scheme is configured to prioritize applications supporting vehicle functionality above the third-party application.

10. The central network unit according to claim 6, wherein the processing circuitry is further configured to receive the information indicating on-board internet usage by the third-party application per assigned operating system resource from the operating system on-board the vehicle.

11. A vehicle communications network comprising a central network unit according to claim 6.

12. A non-transitory computer-readable storage medium comprising instructions, which when executed on a processing circuitry, cause the processing circuitry to perform the method of claim 1.

\* \* \* \* \*